United States Patent Office 2,811,528
Patented Oct. 29, 1957

2,811,528

DIHYDROBENZOBENZOTHIAZOLES

John J. D'Amico, Charleston, W. Va., assignor to Monsanto Chemical Company, St. Louis, Mo., a corporation of Delaware No Drawing. Application March 10, 1955,
Serial No. 493,548

8 Claims. (Cl. 260—299)

The present invention relates to a new class of compounds and to methods for making them.

The new compounds are the 6,7-dihydro-4,5-benzobenzothiazole-2-thiol compounds having attached to the sulfur in the 2-position a radical composed of elements selected from the group consisting of carbon, hydrogen, nitrogen, oxygen, sulfur and metals. Either one or both of the benzene rings may be substituted, as for example by lower alkyl groups. The unsubstituted compounds may be represented by the structure

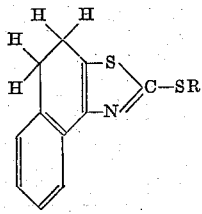

where R represents a radical composed of the elements selected from the group consisting of carbon, hydrogen, nitrogen, oxygen, sulfur and metals. Typical examples are hydrogen, ammonium, alkyl ammonium, cyclohexyl ammonium, sodium, zinc, copper, mercury, lead, cadmium, calcium, barium, alkyl amino, dialkyl amino, alicyclic amino, alkyl, alkenyl, aryl, nitroaryl and thiocarbamyl groups, preferably dialkyl thiocarbamyl groups.

The following examples illustrate the preparation of the new products but are not to be taken as limitative.

EXAMPLE 1

To a stirred suspension containing 330 parts (3.0 moles) of ammonium dithiocarbamate and 1500 ml. of ethyl alcohol was added 640 parts (2.85 moles) of 2-bromotetralone. An exothermic reaction set in causing the temperature to rise from 26° C. to 73° C. over a one minute period. The reaction mixture was stirred for 18 hours and then heated at 78° C. to 80° C. for 2 hours. After cooling to 10° C., the solid was collected by filtration, washed with water until free of halide and air-dried at 50° C. The 2 - mercapto - 6,7 - dihydro - 4, 5 - benzobenzothiazole, M. P. 200–204° C., was obtained in 80.5% yield. After recrystallization from ethyl alcohol it melted at 206–208° C. Analysis gave 6.43% nitrogen and 29.30% sulfur compared to 6.39% nitrogen and 29.24% sulfur calculated for $C_{11}H_9NS_2$.

Substituting 2-bromo-3,3,6,8-tetramethyl-1-tetralone for 2-bromotetralone in the foregoing procedure results in the corresponding tetramethyl substituted thiazole.

EXAMPLE 2

To a stirred solution containing 24 parts (0.11 mole) of 2 - mercapto - 6,7 - dihydro - 4,5 - benzobenzothiazole, 35.2 parts (0.22 mole) of 25% sodium hydroxide, 100 parts of water and 108.9 parts (1.1 moles) of cyclohexylamine was added dropwise at 25–30° C. a solution containing 32.4 parts of iodine, 34.8 parts of potassium iodide and 420 parts of water over a 50 minute period. The reaction mixture was stirred for a half hour longer and then extracted with 500 ml. of ethyl ether. The ether solution was washed with water until the washings were neutral to litmus and dried over sodium sulfate. The ether was removed in vacuo. The product, M. P. 63–66° C., was obtained in 86% yield. After recrystallization from dilute ethyl alcohol the N-cyclohexyl 2-(6,7-dihydro-4,5-benzobenzothiazole)sulfenamide melted at 74–76° C. Analysis gave 8.35% nitrogen and 20.35% sulfur compared to 8.85% nitrogen and 20.26% sulfur calculated for $C_{17}H_{20}N_2S_2$.

EXAMPLE 3

To an agitated suspension of 25 parts (0.114 mole) of 2 - mercapto - 6,7 - dihydro - 4,5 - benzobenzothiazole in 200 ml. of water was added dropwise at 25–28° C. a solution containing 28.6 parts (0.125 mole) of ammonium persulfate and 70 ml. of water over a 40 minute period. The reaction mixture was stirred for an additional 2 hours. The solid was filtered, washed with water until the wash water was neutral to litmus and air-dried at room temperature. The product, M. P. 120–124° C., was obtained in 96.5% yield. After recrystallization from ethyl alcohol the 2,2'-dithiobis 6,7-dihydro-4,5-benzobenzothiazole melted at 125–126° C. Analysis gave 6.41% nitrogen and 29.36% sulfur compared to 6.42% nitrogen and 29.38% sulfur calculated for $C_{22}H_{16}N_2S_4$.

EXAMPLE 4

To a stirred solution containing 43.9 parts (0.2 mole) of 2 - mercapto - 6,7 - dihydro - 4,5 - benzobenzothiazole, 11.2 parts (0.2 mole) of potassium hydroxide and 600 ml. of acetone was added dropwise at 20–25° C. a solution containing 30.3 parts (0.2 mole) of diethyl thiocarbamyl chloride in 150 ml. of acetone. The reaction mixture was stirred for 5½ hours and then filtered to remove the potassium chloride. The filtrate was poured into 700 ml. of ice water and stirred for 15 minutes. The solid was filtered, washed with water until the washings were neutral to litmus and air-dried at room temperature. The yield of 2-diethylthiocarbamylthio-6,7-dihydro-4,5-benzobenzothiazole was 98.5% and the M. P. after recrystallization from alcohol was 117–118° C. Analysis gave 8.16% nitrogen and 28.67% sulfur compared to 8.38% nitrogen and 28.76% sulfur calculated for $C_{16}H_{18}N_2S_3$.

EXAMPLE 5

To a stirred solution at 21° C. containing 33 parts (0.15 mole) of 2 - mercapto - 6,7 - dihydro - 4,5 - benzobenzothiazole, 8.4 parts (0.15 mole) of potassium hydroxide and 300 ml. of acetone was added in one portion 20.2 parts (0.15 mole) of 3 - chloro - 2,4-pentanedione. An exothermic reaction set in causing the temperature to rise from 21 to 41° C. within a one minute period. The reaction mixture was stirred for 5 hours and the potassium chloride removed by filtration. The filtrate was poured into 500 ml. of cold water and after stirring for 20 minutes the solid was filtered, washed with water until the wash water was neutral to litmus and air-dried at room temperature. The product, M. P. 99–102° C., was obtained in 90.5% yield. After recrystallization from ethyl alcohol the 2 - (1 - acetyl - 2 - oxopropylthio) - 6,7 - dihydro-4,5-benzobenzothiazole melted at 105–106° C.

Analysis gave 4.36% nitrogen and 20.08% sulfur compared to 4.41% nitrogen and 20.20% sulfur calculated for $C_{16}H_{15}NO_2S_2$.

EXAMPLE 6

To a stirred solution at 21° C. containing 21.9 parts (0.1 mole) of 2 - mercapto - 6,7 - dihydro - 4,5 - benzobenzothiazole, 5.6 parts (0.1 mole) of potassium hydroxide and 300 ml. of acetone was added in one portion 7.65 parts (0.1 mole) of allyl chloride. An exothermic reaction set in causing the temperature to rise from 27 to 32° C. in 4 minutes. The stirred reaction mixture was heated at 50–60° C. for 4 hours, the potassium chloride removed by filtration and the acetone removed in vacuo. The 2-allylthio - 6, 7 - dihydro - 4, 5 - benzobenzothiazole, an amber colored oil, was obtained in 96.5% yield. Analysis gave 5.03% nitrogen compared to 5.40% calculated for $C_{14}H_{13}NS_2$.

EXAMPLE 7

To a stirred solution at 21° C. containing 33 parts (0.15 mole) of 2-mercapto-6,7-dihydro-4,5-benzobenzothiazole, 8.4 parts (0.15 mole) of potassium hydroxide and 300 ml. of acetone was added in one portion 24.8 parts (0.15 mole) of ethyl α-chloroacetoacetate. An exothermic reaction set in causing the temperature to rise from 26 to 42° C. within a one minute period. The reaction mixture was stirred for 5 hours, the potassium chloride removed by filtration and the acetone removed in vacuo. The filtrate was dissolved in 500 ml. of ethyl ether, the ether solution washed with water until the washings were neutral to litmus, and dried over sodium sulfate. The ether was removed in vacuo. The [2-(1-carboethoxy - 2 - oxypropylthio) - 6,7 - dihydro - 4,5-benzobenzothiazole], a viscous amber oil, was obtained in 90.3% yield. Analysis gave 3.97% nitrogen, 18.57% sulfur compared to 4.03% nitrogen and 18.46% sulfur calculated for $C_{17}H_{17}NO_3S_2$.

EXAMPLE 8

To a stirred suspension at 80° C. containing 20 parts (0.0914 mole) of 2-mercapto-6,7-dihydro-4,5-benzobenzothiazole, 14.6 parts (0.0914 mole) of 25% sodium hydroxide and 2000 ml. of water was added in one portion a solution containing 6.2 parts (0.0457 mole) of zinc chloride in 100 ml. of water. External heating was discontinued and the reaction mixture stirred for 2 hours. The precipitate was filtered, washed with water until the washings were neutral to litmus and air-dried at 50° C. The zinc salt of 2-mercapto-6,7-dihydro-4,5-benzobenzothiazole, M. P. 180–190° C. with decomposition, was obtained in a yield of 99%. Analysis gave 13.41% zinc compared to 13.02% calculated for $C_{22}H_{16}N_2S_4Zn$.

EXAMPLE 9

To a stirred solution at 21° C. containing 21.9 parts (0.1 mole) of 2-mercapto-6,7-dihydro-4,5-benzobenzothiazole, 5.6 parts (0.1 mole) of potassium hydroxide and 300 ml. of acetone was added in one portion 9.3 parts (0.1 mole) of acetonyl chloride. An exothermic reaction set in causing the temperature to rise from 25 to 48° C. in one minute. The reaction was completed and the product isolated as described in Example 5. The 2-acetonylthio - 6,7 - dihydro-4,5-benzobenzothiazole was obtained in 91.1% theory yield. After recrystallization from ethyl alcohol it melted at 68–69° C. Analysis gave 5.06% nitrogen and 23.11% sulfur compared to 5.09% nitrogen and 23.29% sulfur calculated for $C_{14}H_{13}NOS_2$.

EXAMPLE 10

To a stirred solution at 21° C. containing 34 parts (0.155 mole) of 2-mercapto-6,7-dihydro-4,5-benzobenzothiazole, 8.7 parts (0.155 mole) of potassium hydroxide and 300 ml. of acetone was added 9.8 parts (0.078 mole) of 1,4-dichloro-2-butene. The stirred reaction mixture was heated at 50–60° C. for 24 hours and the product isolated as described. The yield of 2,2'-(2-butylenedithio)bis - 6,7-dihydro-4,5-benzobenzothiazole was 98%. After recrystallization from alcohol it melted at 113.114° C. Analysis gave 5.62% nitrogen and 25.78% sulfur compared to 5.71% nitrogen and 26.14% sulfur calculated for $C_{26}H_{22}N_2S_4$.

EXAMPLE 11

To a stirred solution at 25° C. containing 20 parts (0.0914 mole) of 2-mercapto-6,7-dihydro-4,5-benzobenzothiazole, 300 ml. of acetone and 5.1 parts (0.0914 mole) of potassium hydroxide was added dropwise a solution containing 5.6 parts (0.0305 mole) of cyanuric chloride in 400 ml. of acetone. The stirred reaction mixture was heated at 55.56° C. for 5 hours, cooled to 10° C. and the precipitate filtered. The solid was washed with 20 ml. of acetone, then with water until free of chloride and air-dried at 50° C. The yield of 2,4,6-tris(6,7-dihydro-4,5 - benzobenzothiazyl - 2 - thio) - s-triazine was 98.5%. After recrystallization from benzene it melted at 238–239° C. Analysis gave 11.16% nitrogen and 25.93% sulfur compared to 11.47% nitrogen and 26.25% sulfur calculated for $C_{36}H_{24}N_5S_6$.

EXAMPLE 12

To a stirred solution containing 21.9 parts (0.1 mole) of 2 - mercapto - 6,7-dihydro-4,5-benzobenzothiazole, 5.6 parts (0.1 mole) of potassium hydroxide and 300 ml. of acetone was added in one portion 20.3 parts (0.1 mole) of 2,4-dinitrochlorobenzene. The stirred reaction mixture was heated at 50–56° C. for 5 hours. After cooling to room temperature, the reaction mixture was added to 700 ml. of ice water. After stirring for a half hour, the solid was filtered, washed with water until the washings were neutral to litmus and air-dried at room temperature. The yield of 2-(2,4-dinitrophenylthio)-6,7-dihydro-4,5-benzobenzothiazole was 80.5% of theory. After recrystallization from ethyl acetate the melting point was 173–174° C. Analysis gave 16.78% sulfur compared to 16.64% calculated for $C_{17}H_{11}N_3O_4S_2$.

EXAMPLE 13

To a stirred solution containing 43.8 parts (0.2 mole) of 2-mercapto-6,7-dihydro-4,5-benzobenzothiazole, 12.9 parts (0.2 mole) of 87% potassium hydroxide and 500 ml. of acetone was added dropwise 12.3 parts (0.1 mole) of 1,4-dichloro-2-butyne. An exothermic reaction set in causing the temperature to rise from 26 to 38° C. The stirred reaction mixture was heated at 50–56° C. for 24 hours, cooled to 25° C. and the product isolated as described in Example 12. The yield of 2,2'-(2-butynylenedithio) - bis(6,7 - dihydro - 4,5-benzobenzothiazole) was 98% of theory. After recrystallization from ethyl acetate the melting point was 145–146° C. Analysis gave 5.71% nitrogen and 25.99% sulfur compared to 5.73% nitrogen and 26.24% sulfur calculated for $C_{26}H_{20}N_2S_4$.

EXAMPLE 14

To a stirred solution containing 54.9 parts (0.25 mole) of 2-mercapto-6,7-dihydro-4,5-benzobenzothiazole, 40 parts (0.25 mole) of 25% aqueous sodium hydroxide and 500 ml. of hot water was added in one portion 36 parts (0.25 mole) of beta-dimethylaminoethyl chloride hydrochloride and 40 parts (0.25 mole) of 25% aqueous sodium hydroxide. The stirred reaction mixture was heated at 50–60° C. for 5 hours, cooled to 25° C. and extracted with 500 ml. of ethyl ether. The ether solution was washed with water until the washings were neutral to litmus, dried over sodium sulfate and the ether removed in vacuo. The yield of 2-N,N-dimethylaminoethylthio-6,7-dihydro-4,5-benzobenzothiazole, an amber colored oil was 82.5% of theory. Analysis gave 9.42% nitrogen and 22.14% sulfur compared to 9.65% nitrogen and 22.08% sulfur calculated for $C_{15}H_{18}N_2S_2$.

EXAMPLE 15

To a stirred solution containing 109.6 parts (0.5 mole) of 2-mercapto-6,7-dihydro-4,5-benzobenzothiazole, 500 ml. of water and 80 parts (0.5 mole) of 25% sodium hydroxide was added 44.8 parts (0.5 mole) of cyanoethyl chloride. The stirred reaction mixture was heated at 50–60° C. for 2 hours and then at 25–30° C. for 3 hours. The product was then dissolved in 400 ml. of ethyl ether, stirred for an additional 15 minutes and filtered to remove the unreacted 2-mercapto-6,7-dihydro-4,5-benzobenzothiazole. The filtered solid was washed with water until the washings were neutral to litmus, dried over sodium sulfate and the ether removed in vacuo, at a maximum temperature of 80–90° C/1–2 mm. The yield of 2-cyanoethylthio-6,7-dihydro-4,5-benzobenzothiazole, an amber colored oil, was 85.2%. Analysis gave 9.95% nitrogen and 24.10% sulfur compared to 10.28% nitrogen and 23.54% sulfur calculated for $C_{14}H_{12}N_2S_2$. This compound is a useful intermediate for the preparation of the thiazole substituted mercaptopropionic acid by hydrolysis. Partial hydrolysis with peroxide under basic conditions yields the amide. The same compound may be prepared from the thiazole and acrylamide.

EXAMPLE 16

Benzoquinone was recrystallized from methyl alcohol and to a stirred solution containing 27 parts (0.25 mole) of recrystallized benzoquinone at 0° C. was added in one portion a suspension of 54.9 parts (0.25 mole) of 2-mercapto-6,7-dihydro-4,5-benzobenzothiazole in 300 ml. of methyl alcohol. The stirred reaction mixture was held at 5–10° C. for 2 hours, heated to 60° C. and poured into 1000 ml. of hot water. After stirring for a half hour the precipitate was filtered, washed with 500 ml. of hot water and air-dried at room temperature. The yield of 2-(2,5-dihydroxyphenylthio)-6,7-dihydro-4,5-benzobenzothiazole, a tan colored solid, was 90.5% of theory. After recrystallization from chloroform the product melted at 236–238° C. Analysis gave 4.53% nitrogen and 19.54% sulfur compared to 4.28% nitrogen and 19.59% sulfur calculated for $C_{17}H_{13}NO_2S_2$.

The compounds of this invention comprise useful intermediates, pesticides, herbicides and accelerators of vulcanization. As illustrative of accelerating properties, the following rubber stocks were compounded. Mercaptobenzothiazole is a well known rubber accelerator.

| Stock | A | B |
|---|---|---|
| | Parts by weight | |
| GR-S 100 | 100 | 100 |
| Carbon black | 50 | 50 |
| Saturated hydrocarbon softener | 10 | 10 |
| Zinc oxide | 4 | 4 |
| Stearic acid | 2 | 2 |
| Sulfur | 1.75 | 1.75 |
| Mercaptobenzothiazole | 1.2 | |
| 2-Mercapto-6,7-dihydro-4,5-benzobenzothiazole | | 1.2 |

The above stocks so compounded were cured by heating in a press for different periods of time at 144° C. The physical properties of the cured rubber products are set forth below:

Table I

| Stock | Cure Time in Mins. | Modulus of Elasticity in lbs./in.² at Elongations of— | | Tensile at Break in lbs./in.² | Ult. Elong. percent |
|---|---|---|---|---|---|
| | | 500% | 700% | | |
| A | 30 | 376 | 466 | 486 | 1,123 |
| B | 30 | 560 | 743 | 806 | 906 |
| A | 60 | 966 | 1,390 | 1,630 | 900 |
| B | 60 | 1,300 | 1,845 | 1,845 | 700 |

As a further embodiment of the invention stocks were compounded from natural rubber comprising

| Stock | C | D |
|---|---|---|
| | Parts by weight | |
| Smoked sheets | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| 2-Diethylthiocarbamylthio-6,7-dihydro-4,5-benzobenzothiazole | 0.5 | |
| Zinc salt of 2-mercapto-6,7-dihydro-4,5-benzobenzothiazole | | 0.5 |

The compositions were cured by heating in a press for different periods of time at 144° C. The physical properties exhibited by the stocks at optimum cure were as follows:

Table II

| Stock | Modulus of Elasticity in lbs./in.² at Elongation of 300% | Tensile at Break in lbs./in.² |
|---|---|---|
| C | 2,233 | 3,483 |
| D | 1,980 | 3,213 |

As further exemplary of the accelerating properties of the new compounds, a composition was compounded comprising Stock E (parts by weight)
| | |
|---|---|
| Smoked sheets | 100 |
| Carbon black | 50 |
| Zinc oxide | 5 |
| Sulfur | 2.5 |
| Stearic acid | 2.5 |
| Saturated hydrocarbon softener | 3.0 |
| 1,2-Dihydro-2,2,4-trimethyl-6-phenylquinoline | 1.5 |
| N-Cyclohexyl-2(6,7-dihydro-4,5-benzobenzothiazole)sulfenamide | 0.8 |

Cured at 144° C. for 30 minutes, the 300% modulus was 2586 lbs./in.² and the ultimate tensile was 3987 lbs./in.².

It is intended to cover all changes and modifications of the examples of the invention herein chosen for purposes of disclosure which do not constitute departures from the spirit and scope of the invention.

What is claimed is:

1. The 6,7-dihydro-4,5-benzobenzothiazole-2-thiol compounds having the formula $(T-S)_nR$ where T represents the 6,7-dihydro-4,5-benzobenzothiazole group, $n$ is an integer equal to the valence of R and R represents a radical selected from the group consisting of T-S where T has the same significance as before, and radicals containing less than seven carbon atoms selected from the group consisting of hydrogen, sodium, zinc, copper, mercury, lead, cadmium, calcium, barium, alkylamino, dialkylamino, di(lower alkyl)aminoethyl, cyclohexylamino, alkyl, alkenyl, 2-butenylene, 2-butynyl, 2-acetonyl, 1-acetyl-2-oxopropyl, 1-carboethoxy 2-oxypropyl, cyanoethyl, lower dialkyl thiocarbamyl, tricyano, nitrophenyl and 2,5-dihydroxy phenyl radicals.

2. A lower 2-dialkylthiocarbamylthio-6,7-dihydro-4,5-benzobenzothiazole.

3. 2-Diethylthiocarbamylthio-6,7-dihydro-4,5-benzobenzothiazole.

4. 2-Mercapto-6,7-dihydro-4,5-benzobenzothiazole.

5. The zinc salt of 2-mercapto-6,7-dihydro-4,5-benzobenzothiazole.

6. 2,2'-Dithiobis-6,7-dihydro-4,5-benzobenzothiazole.

7. The method which comprises condensing a 2-halotetralone with a salt of dithiocarbamic acid and isolating 2-mercapto-6,7-dihydro-4,5-benzobenzothiazole.

8. The method which comprises condensing 2-bromotetralone with ammonium dithiocarbamate and isolating 2-mercapto-6,7-dihydro-4,5-benzobenzothiazole.

References Cited in the file of this patent

UNITED STATES PATENTS

| | | |
|---|---|---|
| 1,838,062 | Teppema | Dec. 22, 1931 |
| 2,106,465 | Orthner et al. | Jan. 25, 1938 |
| 2,226,799 | Beaver | Dec. 31, 1940 |

FOREIGN PATENTS

| | | |
|---|---|---|
| 180,858 | Switzerland | Feb. 1, 1936 |